United States Patent
Kim et al.

(10) Patent No.: US 9,038,182 B2
(45) Date of Patent: May 19, 2015

(54) METHOD OF DEFENDING AGAINST A SPOOFING ATTACK BY USING A BLOCKING SERVER

(75) Inventors: Jun Seob Kim, Seoul (KR); Woo Young Jung, Seoul (KR)

(73) Assignee: ESTsoft Corp., Seoul (KR)

( * ) Notice: Subject to any disclaimer, the term of this patent is extended or adjusted under 35 U.S.C. 154(b) by 8 days.

(21) Appl. No.: 14/117,131

(22) PCT Filed: Mar. 8, 2012

(86) PCT No.: PCT/KR2012/001714
§ 371 (c)(1),
(2), (4) Date: Nov. 12, 2013

(87) PCT Pub. No.: WO2012/153913
PCT Pub. Date: Nov. 15, 2012

(65) Prior Publication Data
US 2014/0325651 A1    Oct. 30, 2014

(30) Foreign Application Priority Data
May 12, 2011    (KR) .................... 10-2011-0044667

(51) Int. Cl.
*H04L 29/06*    (2006.01)
*H04L 29/12*    (2006.01)

(52) U.S. Cl.
CPC ........... *H04L 63/1483* (2013.01); *H04L 61/103* (2013.01); *H04L 63/1466* (2013.01); *H04L 63/0236* (2013.01)

(58) Field of Classification Search
USPC .......................................................... 726/23
See application file for complete search history.

(56) References Cited

U.S. PATENT DOCUMENTS

| | | | |
|---|---|---|---|
| 7,234,163 B1 * | 6/2007 | Rayes et al. .................... | 726/22 |
| 7,562,390 B1 * | 7/2009 | Kwan .............................. | 726/23 |
| 8,819,285 B1 * | 8/2014 | Wilkinson et al. ............. | 709/246 |

(Continued)

FOREIGN PATENT DOCUMENTS

| KR | 10-2004-0109985 | 12/2004 |
|---|---|---|
| KR | 10-2006-0064450 | 6/2006 |
| KR | 10-0807933 | 3/2008 |
| KR | 10-2008-0107599 | 12/2008 |

OTHER PUBLICATIONS

Kyoungju Kwak et al., "Analysis and countermeasures of security vulnerablility on portal sites", Feb. 2011.*

(Continued)

*Primary Examiner* — Yonas Bayou
(74) *Attorney, Agent, or Firm* — Preston Smirman; Smirman IP Law, PLLC

(57) ABSTRACT

The present invention relates to a method of defending against a spoofing attack using a blocking server, and more particularly, to a method of defending against a spoofing attack using a blocking server, which is characterized in that it involves inspecting an IP and MAC address included in an ARP packet received by a client in a network, and changing the addresses to a legitimate IP address and to a corresponding MAC address when the addresses are found to be used in a spoofing attack. According to the present invention, in the blocking of a spoofing attack against a network, an IP address and a MAC address for legitimate hardware connected to the network may be prestored and monitored, so as to exhibit the effect of an accurate defense being enabled in a short time.

3 Claims, 5 Drawing Sheets

(56) References Cited

U.S. PATENT DOCUMENTS

| | | | |
|---|---|---|---|
| 2006/0036733 A1* | 2/2006 | Fujimoto et al. | 709/225 |
| 2006/0114863 A1* | 6/2006 | Sanzgiri et al. | 370/338 |
| 2007/0101429 A1* | 5/2007 | Wakumoto et al. | 726/23 |
| 2008/0196085 A1* | 8/2008 | Nagoya et al. | 726/3 |
| 2009/0178116 A1* | 7/2009 | Nagoya et al. | 726/3 |
| 2009/0265785 A1* | 10/2009 | Kwan | 726/23 |
| 2010/0107250 A1* | 4/2010 | Li | 726/22 |
| 2010/0142523 A1* | 6/2010 | Ohman et al. | 370/389 |
| 2013/0111589 A1* | 5/2013 | Cho | 726/23 |

OTHER PUBLICATIONS

Han-Wei Hsiao et al., "Constructing an ARP attack detection system with SNMP traffic data mining", Aug. 2009.*
Ferdous A. Barbhuiya et al., "Detection of neighbor solicitation and advertisement spoofing in IPv6 neighbor discovery protocol " Nov. 2011.*
English Abstract of KR 10-2004-0109985.
English Abstract of KR 10-2006-0064450.
English Abstract of KR 10-2008-0107599.

* cited by examiner ns separately connected to each port and a router having a filtering function. However, in the method, since the filtering operation is carried out by using the local network address instead of the individual IP address of each host, when the spoofing is executed by using other address of an optional local network, there are some problems in that it is impossible to detect the spoofing and it is also impossible to deal with the ARP spoofing.

METHOD OF DEFENDING AGAINST A SPOOFING ATTACK BY USING A BLOCKING SERVER

CROSS-REFERENCE TO RELATED APPLICATION

The instant application is a national phase of PCT International Application No. PCT International Application No. PCT/KR2012/001714, filed on Mar. 8, 2012, and claims priority to Korean Patent Application Serial No. 10-2011-0044667, filed May 12, 2011, the entire specifications of both of which are expressly incorporated herein by reference.

TECHNICAL FIELD

The present invention relates to a spoofing attack defense method using a blocking server, and more particularly, to a spoofing attack defense method using a blocking server, which is characterized by checking IP and MAC addresses included in an ARP packet received by a client in a network and then changing the addresses to a legitimate IP address and a corresponding MAC address when it is confirmed that the addresses are used in a spoofing attack.

BACKGROUND ART

As the use of the Internet is increased day by day, hacking skills are also developed and now, since various hacking programs are scattered on the network, even an ordinary person, not an expert, can be a hacker.

Fundamental means which is used for hacking such Dos, DDoS, Sniffing and Hijacking is ARP or IP spoofing. Herein, the ARP (Address Resolution Protocol) spoofing is to falsify a sender hardware address and a sender IP address, and it is an attack technique that uses a MAC address of an attack system as source information of an ARP Reply packet with respect to an IP address of other system in a local network and changes an ARP table of other router, switch or host in the local network, such that the packet, not the IP address, of the attack system is transferred to the attack system by using the MAC address of the attack system.

In addition, the IP spoofing is an attack technique that changes its own source IP and makes other systems not know who it is or makes it mistaken for another system.

Now, most of hacking damages are caused by the ARP or IP spoofing, and by using a spoofing tool that can be easily obtained through Internet, everyone can attack a particular host or can steal a look at information through a network using a spoofing tool obtained on Internet, and thus personal information that should be kept secure may be easily and frequently expropriated.

For example, various IP packets which are executed in other host connected to an internal network are peeped through the ARP spoofing, and the personal information may be leaked, and there is a risk that even financial information may be exposed. Further, an administer-leveled ID and password of a certain server is peeped or stolen by a third party, and thus information in the server may be arbitrarily falsified. Furthermore, in case that online activities carried out on an external network can be peeped or stolen by a third party, more systems may be easily exposed to the attack.

As a technique that is currently used to prevent the spoofing, there is a method in which a filtering operation is performed with respect to an IP packet received from an external network by using an IP network address assigned to a local network and a mask instead of each individual IP address for hosts which are separately connected to each port and a router having a filtering function. However, in the method, since the filtering operation is carried out by using the local network address instead of the individual IP address of each host, when the spoofing is executed by using other address of an optional local network, there are some problems in that it is impossible to detect the spoofing and it is also impossible to deal with the ARP spoofing.

DISCLOSURE

Technical Problem

An object of the present invention is to provide a spoofing attack defense method using a blocking server, in which each client PC checks an ARP table and an ARP packet using a blocked MAC address list and an allowed IP-MAC address list containing effective IP-MAC address information of all client PCs in a network obtained from a blocking server, thereby responding against an ARP spoofing attack in real time or later.

Another object of the present invention is to provide a spoofing attack defense method using a blocking server, in which the blocked MAC address list and allowed IP-MAC address list are stored in the blocking server or each client so that the blocking server or each client can independently detect and block the spoofing attack.

Technical Solution

To achieve the object of the present invention, the present invention provides a spoofing attack defense method using a blocking server, which checks an IP address and a MAC address included in an ARP packet relayed through an L2 switch 104 in a network and blocks a transferring of the ARP packet when it is confirmed that the addresses are used in a spoofing attack, including a first step that an address collecting part 108-1 of the blocking server 108 collects IP addresses and MAC addresses of clients 106 connected to the network; a second step that the address collecting part 108-1 generates an allowed IP-MAC address list in which the IP address and MAC address collected in the first step are corresponding to each other and stores the allowed IP-MAC address list in an allowed address DB 108-3; a third step that the address collecting part 108-1 stores a blocked MAC address list, which is information about the MAC address of a client 106 used by a spoofing attacker, in a blocked address DB 108-4; a fourth step that, when an ARP packet is introduced to the client 106, an ARP packet processing part 106-1c of the client 106 extracts an IP address and a MAC address of a sender included in the ARP packet, transfers the extracted IP address and MAC address to the blocking server 108 and requests a check on whether there is a spoofing attack; a fifth step that, when the MAC address of the sender extracted in the fourth step is included in the blocked MAC address list stored in the block address DB 108-4, as a checking result of an address checking part 108-2 of the blocking server 108, the blocking server 108 informs a fact that the ARP packet is infected to the client 106; and a sixth step that the ARP packet processing part 106-1c blocks transferring and receiving of the infected ARP packet.

Preferably, the fifth step further includes a 5-1th step that, when the MAC address of the sender extracted in the fourth step is not included in the blocked MAC address list, if the IP address and MAC address of the sender is not in the allowed IP-MAC address list, or if the IP address and MAC address of the sender is different from configuration of the allowed IP- MAC addresses which are mapped in the allowed IP-MAC address list and stored in an address pair, the ARP packet is defined as a suspected ARP packet;

a 5-2th step that the address checking part 108-2 accrues the number of transferred ARP packets having the same sender MAC address as a sender MAC address included in the suspected ARP packet out of the ARP packets introduced to the client 106 during unit time; and a 5-3th step that, the accrued number during a desired period of time is more than a threshold value, the suspected ARP is categorized as an infected ARP packet.

According to other embodiment of the present invention, the present invention provides a spoofing attack defense method using a blocking server, which checks an IP address and a MAC address included in an ARP packet relayed through an L2 switch 104 in a network and blocks a transferring of the ARP packet when it is confirmed that the addresses are used in a spoofing attack, including a first step that an address collecting part 108-1 of the blocking server 108 collects IP addresses and MAC addresses of clients 106 connected to the network; a second step that the address collecting part 108-1 generates an allowed IP-MAC address list in which the IP address and MAC address collected in the first step are corresponding to each other and stores the allowed IP-MAC address list in an allowed address DB 108-3; a third step that the address collecting part 108-1 stores a blocked MAC address list, which is information about the MAC address of a client 106 used by a spoofing attacker, in a blocked address DB 108-4; a fourth step that an ARP table protecting part 106-1b of the client 106 extracts an IP address and a MAC address of an ARP entry included in an ARP table of the client 106, transfers the extracted IP address and MAC address to the blocking server 108 and requests a check on whether there is a spoofing attack; a fifth step that, when the MAC address extracted in the fourth step is included in the blocked MAC address list stored in the block address DB 108-4, as a checking result of an address checking part 108-2 of the blocking server 108, the blocking server 108 informs a fact that the ARP entry is infected to the client 106; and a sixth step that the ARP table protecting part 106-1b blocks extracts the IP address included in the infected ARP entry and refers an normal MAC address stored to be corresponding to the extracted IP address to the allowed IP-MAC address list; and a seventh step that the ARP table protecting part 106-1b changes the MAC address of the infected ARP entry into the referred normal MAC address.

According to another embodiment of the present invention, the present invention provides a spoofing attack defense method using a blocking server, which checks an IP address and a MAC address included in an ARP packet relayed through an L2 switch 104 in a network and blocks a transferring of the ARP packet when it is confirmed that the addresses are used in a spoofing attack, including a first step that an address collecting part 108-1 of the blocking server 108 collects IP addresses and MAC addresses of clients 106 connected to the network; a second step that the address collecting part 108-1 generates an allowed IP-MAC address list in which the IP address and MAC address collected in the first step are corresponding to each other and stores the allowed IP-MAC address list in an allowed address DB 106-1d of the client 106; a third step that the address collecting part 108-1 stores a blocked MAC address list, which is information about the MAC address of a client 106 used by a spoofing attacker, in a blocked address DB 108-4; a fourth step that, when an ARP packet is introduced to the client 106, an ARP packet processing part 106-1c of the client 106 extracts an IP address and a MAC address of a sender included in the ARP packet and checks whether there is a spoofing attack; a fifth step that, when the MAC address of the sender extracted in the fourth step is included in the blocked MAC address list, the ARP packet is categorized as an infected ARP packet by the ARP packet processing part 106-1c; and a sixth step that the ARP packet processing part 106-1c blocks transferring and receiving of the infected ARP packet.

Preferably, the fifth step further includes a 5-1th step that, when the MAC address of the sender extracted in the fourth step is not included in the blocked MAC address list, if the IP address and MAC address of the sender is not in the allowed IP-MAC address list, or if the IP address and MAC address of the sender is different from configuration of the allowed IP-MAC addresses which are mapped in the allowed IP-MAC address list and stored in an address pair, the ARP packet is defined as a suspected ARP packet;

a 5-2th step that the ARP packet processing part 106-1c accrues the number of transferred ARP packets having the same sender MAC address as a sender MAC address included in the suspected ARP packet out of the ARP packets introduced to the client 106 during unit time; and a 5-3th step that, the accrued number during a desired period of time is more than a threshold value, the suspected ARP is categorized as an infected ARP packet.

According to yet another embodiment of the present invention, the present invention provides a spoofing attack defense method using a blocking server, which checks an IP address and a MAC address included in an ARP packet relayed through an L2 switch 104 in a network and blocks a transferring of the ARP packet when it is confirmed that the addresses are used in a spoofing attack, including a first step that an address collecting part 108-1 of the blocking server 108 collects IP addresses and MAC addresses of clients 106 connected to the network; a second step that the address collecting part 108-1 generates an allowed IP-MAC address list in which the IP address and MAC address collected in the first step are corresponding to each other and stores the allowed IP-MAC address list in an allowed address DB 106-1d of the client 106; a third step that the address collecting part 108-1 stores a blocked MAC address list, which is information about the MAC address of a client 106 used by a spoofing attacker, in a blocked address DB 106-1e of the client 106; a fourth step that an ARP table protecting part 106-1b of the client 106 extracts an IP address and a MAC address of an ARP entry included in an ARP table of the client 106 and checks whether there is a spoofing attack; a fifth step that, when the MAC address extracted in the fourth step is included in the blocked MAC address list, the ARP entry is categorized as an infected ARP entry by the ARP table protecting part 106-1b; a sixth step that the ARP table protecting part 106-1b blocks extracts the IP address included in the infected ARP entry and refers an normal MAC address stored to be corresponding to the extracted IP address to the allowed IP-MAC address list; and a seventh step that the ARP table protecting part 106-1b changes the MAC address of the infected ARP entry into the referred normal MAC address.

According to yet another embodiment of the present invention, the present invention provides a spoofing attack defense method using a blocking server, which checks an IP address and a MAC address included in an ARP packet relayed through an L2 switch 104 in a network and blocks a transferring of the ARP packet when it is confirmed that the addresses are used in a spoofing attack, including a first step of collecting an IP address and a MAC address of devices installed in a particular client 106; a second step of storing a local IP-MAC address list, in which the IP address and MAC address collected in the first step are corresponding to each other, in an allowed address DB 106-1*d* of the client 106; a third step that, when an ARP packet is transferred from the particular client, an ARP packet processing part 106-1*c* of the particular client 106 extracts an IP address and a MAC address of a sender included in the transferred ARP packet and checks whether there is the spoofing attack; a fourth step that, if the IP address of the sender extracted in the third step is not included in the local IP-MAC address list, or it the MAC address stored to be corresponding to the same IP address as the extracted IP address of the sender is different from the MAC address of the sender included in the transferred ARP packet, the transferred ARP packet is categorized as an infected ARP packet by the ARP packet processing part 106-1*c*; and a fifth step that the ARP packet processing part blocks transferring of the infected ARP packet.

Advantageous Effects

According to the present invention, in the blocking of the spoofing attack on a network, it is possible to previously store an IP address and MAC address for a normal hardware connected to the network and then monitor it, and thus it is possible to perform a precise defending process at the earliest practicable time.

Further, since the blocked MAC address list and allowed IP-MAC address list are stored in each client as well as the blocking server and each client can detect and block the spoofing attack, it is possible to reduce the load of the blocking server and also reduce responding time.

DESCRIPTION OF DRAWINGS

The above and other objects, features and advantages of the present invention will become apparent from the following description of preferred embodiments given in conjunction with the accompanying drawings, in which.

[Detailed Description of Main Elements]

| | |
|---|---|
| 102: router | 104: L2 switch |
| 106: client | 108: blocking server |
| 110: administrator terminal | |

BEST MODE

Hereinafter, a spoofing attack defense method using a blocking server (hereinafter, called 'defense method') according to the embodiments of the present invention will be described in detail with reference to accompanying drawings.

Figure 1:
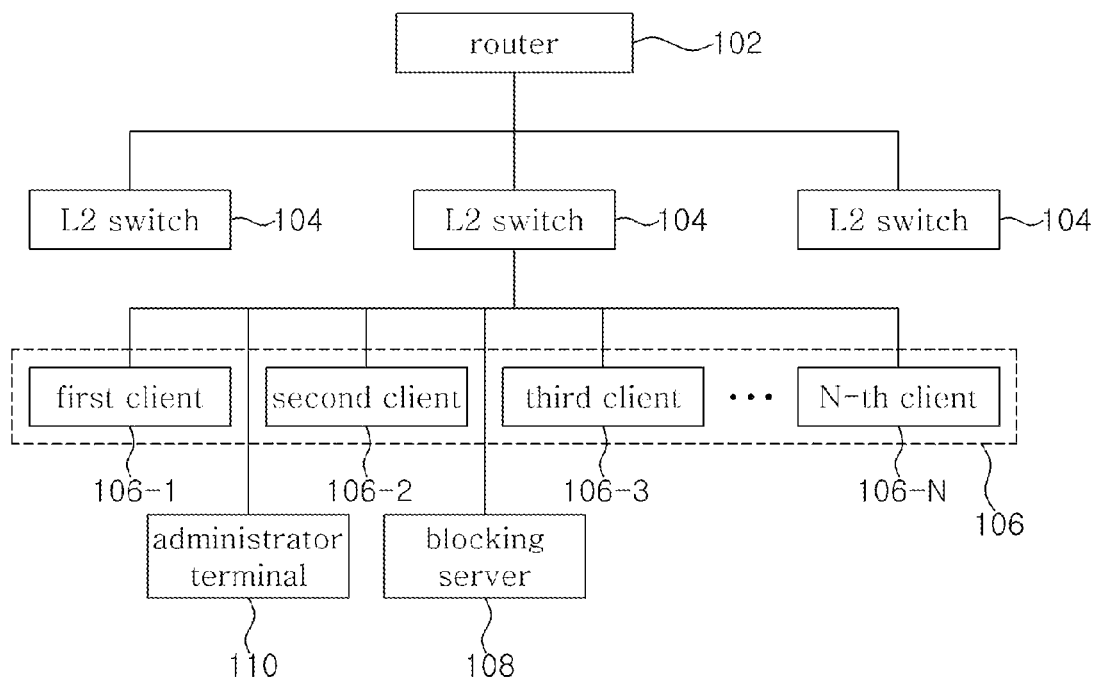
FIG. 1 is a block diagram showing the configuration of a network including a blocking server according to an embodiment of the preset invention.
Figure 2:
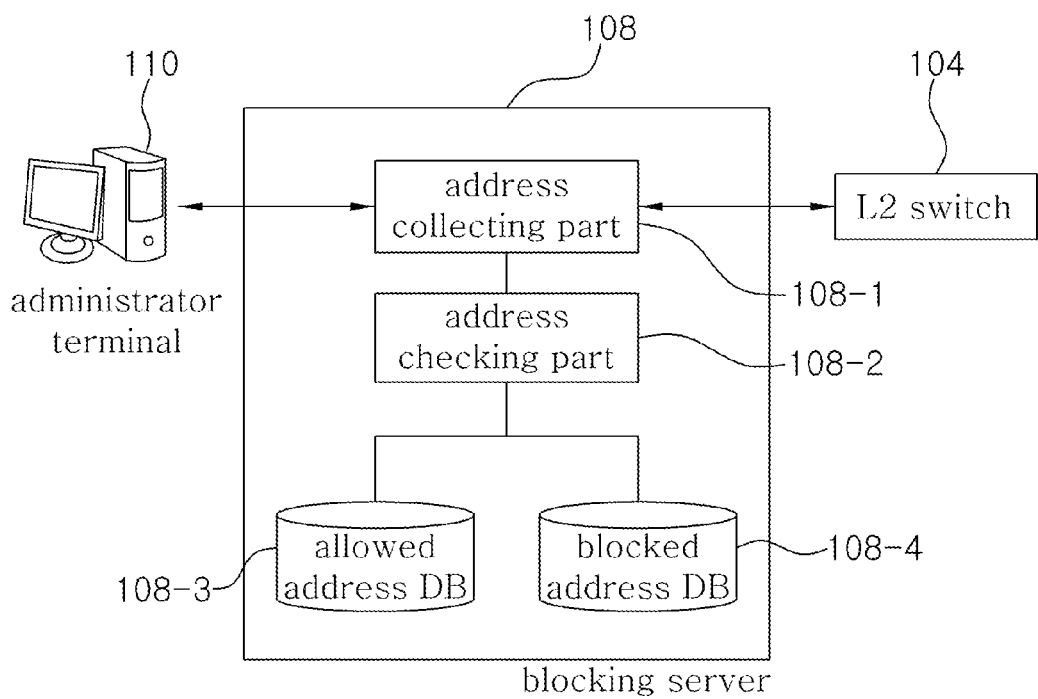
FIG. 2 is a block diagram showing the configuration of the blocking server of FIG. 1.
Figure 3:
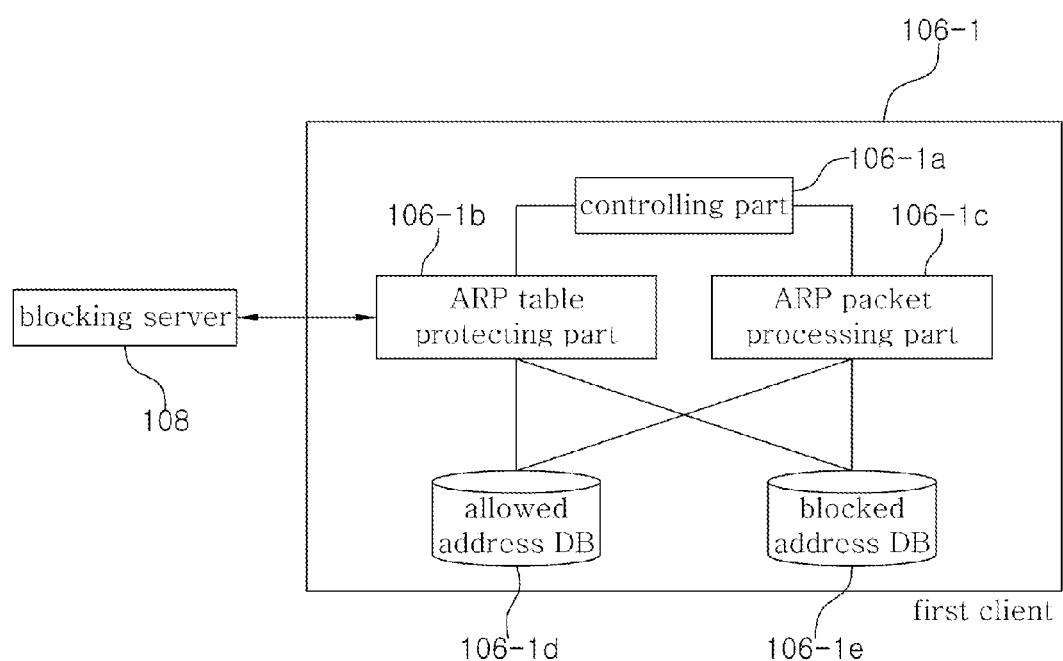
FIG. 3 is a block diagram showing the configuration of a client of FIG. 1.

FIG. 1 is a block diagram showing the configuration of a network including a blocking server according to an embodiment of the preset invention, FIG. 2 is a block diagram showing the configuration of the blocking server of FIG. 1, and FIG. 3 is a block diagram showing the configuration of a client of FIG. 1.

The defense method according to the embodiment of the present invention includes a client 106 which is connected to a lower end of an L2 switch 104 included in a network, a blocking server 108 which is connected with the each client 106, and an administrator terminal 110 in which an object to be blocked is manually input. The client 106 consists of N terminals from a first client 106-1 to an N-th client 106-N.

The clients 106-1 to 106-N receive and transfer an IP packet through ARP. To this end, an ARP packet includes IP addresses and mapped MAC addresses of the clients 106-1 to 106-N.

The blocking server 108 receives an effective IP-MAC address list from the client 106 or the administrator 110 through an IP-MAC address list collecting process and prepares an allowed IP-MAC address list based on the received effective IP-MAC address list. The blocking server 108 checks the ARP packet received and transferred through the L2 switch 104 using the allowed IP-MAC address list and determines whether there is a spoofing attack.

The blocking server 108 transfers the allowed IP-MAC address list to each client 106, such that the allowed IP-MAC address list is stored therein and the client 106 can directly check the spoofing attack.

In the present invention, the combination of an IP address of the client 106 and a corresponding MAC address (i.e., MAC address of an adapter installed at each client) is called the "IP-MAC address".

In a process of checking an ARP spoofing attack, the client 106 checks whether an ARP table is infected through an ARP table protecting part 106-1*b* and an ARP packet processing part 106-1*c* and also checks the ARP packet received and transferred through the client 106.

The ARP table protecting part 106-1*b* grasps all ARP entries of the ARP table configured in the client 106. The grasping of the ARP entries may be performed periodically or may be performed whenever information of blocked addresses is updated. If there is an infected one out of the ARP entries, a process of blocking the attack is carries out.

The ARP packet processing part 106-1*c* checks whether the ARP packet is infected whenever it enters the client 106.

Figure 4:
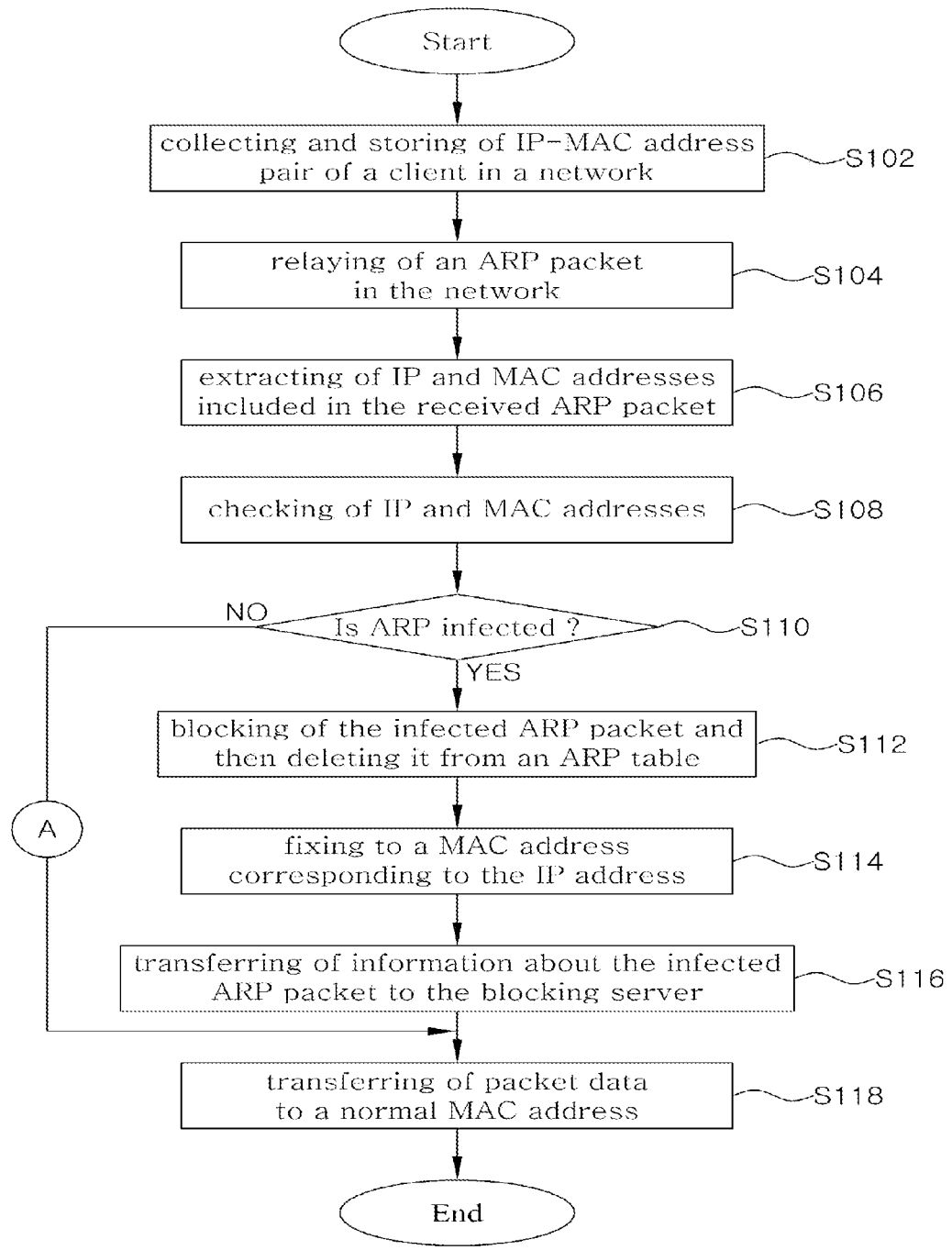
FIG. 4 is a flow chart showing a process of blocking a spoofing attack.
Figure 5:
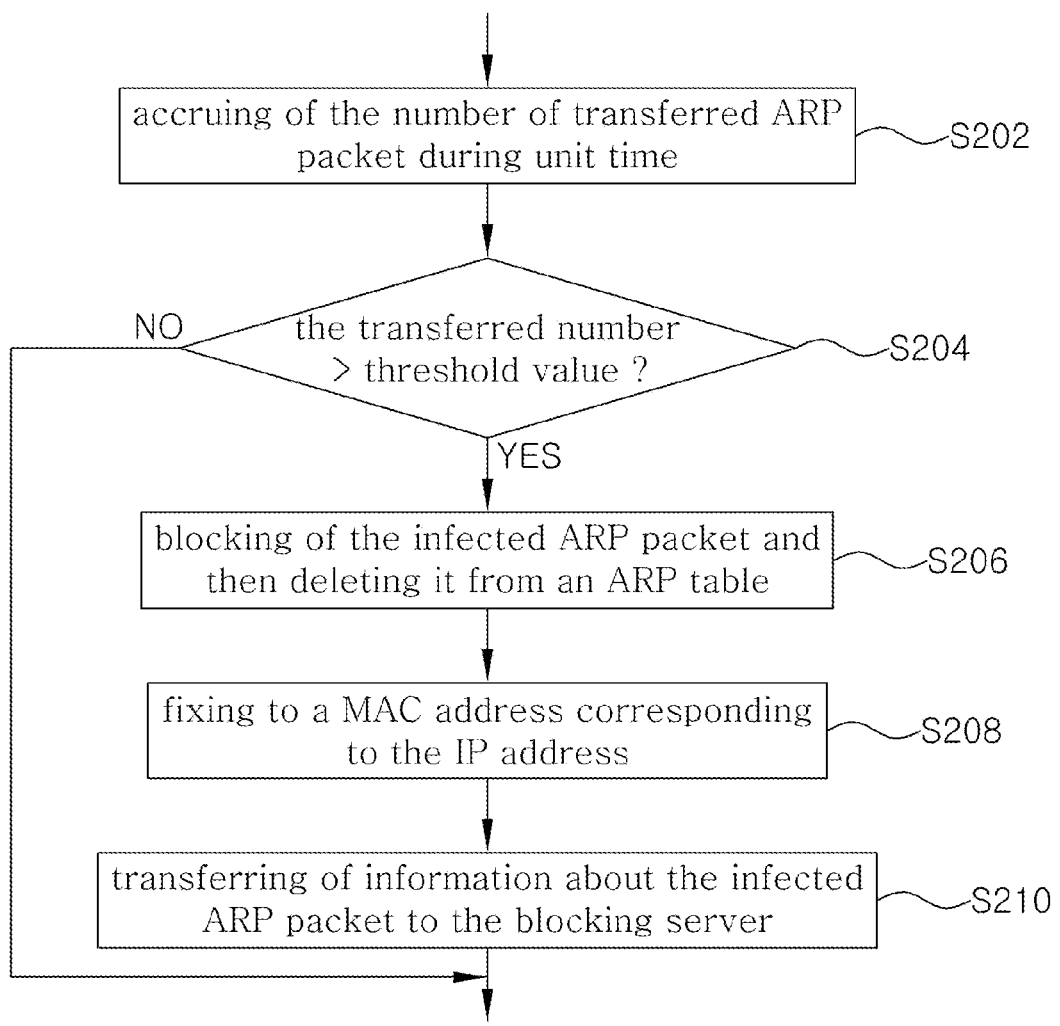
FIG. 5 is a flow chart showing a process of monitoring a packet suspected of a spoofing attack.

The infected ARP entry or infected ARP packet found in the checking process is processed in the ARP spoofing attack blocking process by the blocking server (referring to FIG. 4), and the suspected ARP entry or suspected ARP packet is processed in a process of requesting suspected MAC address confirmation (referring to FIG. 5).

FIG. 4 is a flow chart showing a process of blocking a spoofing attack, and FIG. 5 is a flow chart showing a process of monitoring a packet suspected of a spoofing attack.

Hereinafter, the operation of the blocking server 108 according to the embodiment of the present invention will be described with reference to FIGS. 1 to 5.

The blocking server 108 collects and stores the IP-MAC address list of all clients 106 in the network (S102). The object to be collected by the blocking server 108 includes all terminals configuring a local network and means all of L2 switches 104 and clients 106 connected to a lower portion of one router 102.

To this end, the client 106 included in the network collects its own IP address and MAC addresses of all adapters (hardware) and then transfers them to the blocking server 108.

The collecting and transferring of the IP-MAC addresses may be automatically (periodically) performed, or may be performed when a particular event, e.g., replacing or adding of a device, occurs.

In case that adapter information, e.g., adding of a new adapter or removing of an existing adapter, is changed, the client 106 transfers a changed IP-MAC address to the blocking server 106.

The collecting of the IP-MAC addresses may be performed manually by an administrator. The administrator of a network collects the IP-MAC addresses for one or more individual clients 106-1 to 106-N connected to the network and then manually inputs them to the blocking server 108 through the administrator terminal 110.

The IP-MAC address information that is automatically collected by the client 106 or manually input by the administrator is stored in the blocking server 108. An address collecting part 108-1 receives the effective IP-MAC address list input from the client 106 or the administrator terminal 110.

Because the IP-MAC address information stored in the blocking server 108 is effective address information for devices (switch, client) included in the network, it is a white list in which the exchange of a data packet is allowed.

In the present invention, a real IP-MAC address list that is not distorted is defined as an allowed IP-MAC address list, and address information for devices installed at a certain client 106 in the allowed IP-MAC address list is called a local IP-MAC address list of a corresponding client 106. The local IP-MAC address list is automatically generated by a particular client 106 and then transferred to the blocking server 108. The rest list except the local IP-MAC address list in the allowed IP-MAC address list is input manually by the administrator, obtained in the attack monitoring process and then input by the client 106, or obtained from a security system of an external agency and then stored.

The reason why to separately store the local IP-MAC address list is to check whether the ARP packet transferred from the client 106 is infected. When the client 106 transfers the ARP packet to other host in a situation of having the MAC addresses for all of the devices of the client 106, if an IP address of a sender included in the transferred ARP packet is not contained in the local IP-MAC address list, or a MAC address that is stored to be corresponding to the same IP address as the IP address of the sender is different from the MAC address of the sender included in the transferred ARP packet, it can be regarded that the client 106 itself is already under the spoofing attack and thus the IP address and MAC address are changed. In this case, it is necessary to immediately block the transferring of the ARP packet. To this end, it is preferable to separately maintain the local IP-MAC address list.

The IP address and MAC address in the allowed IP-MAC address list are in a relationship of 1:N.

In other words, since multiple adapters having independent MAC addresses may be installed at the client 106 having one IP address, the one IP address and multiple MAC addresses may be stored in each address pair.

In order to manage the allowed IP-MAC address list, the blocking server 108 may automatically request and receive the allowed IP-MAC address list from the client 106. Otherwise, if the administrator manually inputs the allowed IP-MAC address list, the blocking server 108 may store the input allowed IP-MAC address list.

Meanwhile, in case that a MAC address of a departure point (sender) recorded in an Ethernet header of an ARP packet relayed through the L2 switch 104 is used in the spoofing attack, The MAC address is added to a blocked MAC address list and thus a further future attack can be prevented.

A terminal which tries the spoofing attack is one of the clients 106 included in the network, and the blocked MAC address list used in the present invention means a hardware address of the client 106 which is used by an attacker. The blocked MAC address list may be generated and added by a continuously monitoring through the blocking server 108 and an inputting of the administrator.

Unlike the allowed IP-MAC address list in which the IP address and corresponding MAC address are stored in a pair, the blocked MAC address list contains only the MAC addresses that the transferring of a packet is blocked. Even when the attacker arbitrarily falsifies the IP address and then includes the falsified IP address in the ARP packet, data is transferred to the L2 switch 104 having the same MAC address and the spoofing attack is carried out. Therefore, the reason why the blocked MAC address list contains only the MAC addresses that the transferring of a packet is blocked is to prevent a data packet from being transferred to the L2 switch 104 having the same MAC address regardless of the IP address.

The blocking server 108 stores the allowed IP-MAC address list and the blocked MAC address list in an allowed address DB 108-3 and a blocked address DB 108-4, respectively. The blocking server 108 checks whether the ARP packet transferred through the network is infected based on the allowed IP-MAC address list and the blocked MAC address list stored in the two DBs 108-3 and 108-4.

And the blocking server 108 transfers the allowed IP-MAC address list and the blocked MAC address list to the corresponding client 106 the moment it is noticed of time when the particular client 106 is connected to the network.

If the allowed IP-MAC address list and the blocked MAC address list are changed, the blocking server 108 transfers the changed allowed IP-MAC address list and blocked MAC address list to all of the clients 106 included in the network.

The allowed IP-MAC address list and blocked MAC address list transferred to the client 106 are stored in an allowed address DB 106-1*d* and a blocked address DB 106-1*e*, respectively. The process of transferring and storing the allowed IP-MAC address list and the blocked MAC address list in the client 106 may be selectively applied. In case that the client 106 has such address lists, the client 106 itself can check the input ARP packet and determines whether there is the spoofing attack. If it is set that such address lists are not transferred to each client 106, the blocking server 108 determines whether there is the spoofing attack whenever the ARP packet is input.

The ARP table protecting part 106-1*b* checks the ARP entry contained in the ARP table of the client 106 and checks whether it is infected whenever the new allowed IP-MAC address list and blocked MAC address list are transferred.

When the Allowed Address List is Stored Only in the Blocking Server

Firstly, a checking process when only the blocking server 108 has the allowed IP-MAC address list and the blocked MAC address list will be described.

The L2 switch 104 relays (receives and transfers) all of the ARP packets passing through the network (S104).

A network filter driver installed at the client 106 checks the ARP packet, which is received and transferred through the client 106, in real time. Herein, the ARP packet means that of all operation types including an ARP Request and an ARP Reply.

The ARP packet processing part 106-1*c* of the client 106 that receives the ARP packet extracts the IP address and MAC address of the departure point (sender) included in the received ARP packet and then transfers them to the blocking server 108 in order to request a check on whether there is the spoofing attack (S106). Further, the ARP table protecting part 106-1*b* extracts the IP address and MAC address of the departure point of the ARP entry contained in the ARP table and transfers them to the blocking server 108.

The checking request may be performed in a desired period of time, or whenever the ARP packet is input, or whenever the allowed or blocked address lists are changed.

An address checking part 108-2 compares the extracted IP-MAC address with the address lists stored in the DBs 108-3 and 108-4 and checks whether there is the spoofing attack (S108).

First of all, the address checking part 108-2 checks whether the same address as the MAC address of the departure point of the transferred ARP entry or ARP packet is stored in the blocked address DB 108-4.

If the MAC address of the departure point of the ARP entry or ARP packet transferred from the client 106 used by the attacker is the same as that of the IP-MAC address list stored in the blocked address DB 108-4, it can be determined that this ARP packet is used in the spoofing attack for intercepting the packet data through an falsified MAC address. And this is called an infected ARP packet.

For example, assuming that the first client 106-1 is the attacker's terminal for intercepting packets transferred between a second client 106-2 and a third client 106-3, the first client 106-1 transfers the infected ARP packet to the second and third clients 106-2 and 106-3 and disguises itself as if its own MAC address is an address of a normal receiver. In other words, the MAC address of the first client 106-1 is recorded on a desired place of the ARP table of the second client 106-2 that the MAC address of the third client 106-3 is recorded, and also the MAC address of the first client 106-1 is recorded on a desired place of the ARP table of the third client 106-3 that the MAC address of the second client 106-2 is recorded.

If the infection is achieved as described above, the packet transferred from the second client 106-2 to the third client 106-3 and the packet transferred from the third client 106-3 to the second client 106-2 are transferred to the first client 106-1. The first client 106-1 captures and stores the packets input from the second and third clients 106-2 and 106-3 and then transfers them to a normal destination or blocks the transferring of the packets, thereby interrupting the normal communication.

The blocking server 108 compares the previously stored IP-MAC address pair of all clients 106 with the IP-MAC address pair contained in the newly input ARP packet or ARP entry and determines whether it has the normal MAC address.

The infected packet input from the attacker's client 106 is blocked by the blocking server 108 so as to be not transferred to the client 106 having the MAC address of the receiver, and the ARP table of the client 106 is changed to the MAC address of a normal device.

If the same address as the MAC address of the sender (departure point) of the transferred ARP packet or ARP entry is not included in the blocked address DB 108-4, the address checking part 108-2 checks the allowed address DB 108-3 and determines whether there is the same MAC address.

If the combination of the IP address and MAC address of the sender is the same as the combination stored in the allowed IP-MAC address list, this packet is transferred from the normal device and thus it can be regarded to be irrelevant to the spoofing attack. Therefore, the data packet should be transferred to the client 106 corresponding to the IP-MAC address of the destination included in the ARP packet, but before the transferring of the data packet, a checking process for the suspected packet is carried out.

If it is not possible to find the same address as the MAC address of the sender from the addresses stored the two DBs 108-3 and 108-4, or the MAC address of the sender is not in the blocked MAC address list but the combination of the IP address and MAC address is different from the combination stored in the allowed IP-MAC address list, it cannot be yet determined whether it is the safe packet or infected packet. In this case, it is categorized as the suspected ARP packet and a separate checking process is performed (referring to A step of FIG. 4 and FIG. 5).

If the MAC address of the sender of the introduced ARP packet is not in the blocked MAC address list, there is high possibility that it is not the infected packet, but after confirming whether it satisfies two additional conditions, it is categorized as the suspected ARP packet.

Firstly, it is a case that the IP address and MAC address of the sender is not in the allowed IP-MAC address list. In other words, if the IP address and MAC address of the sender is not in the allowed address list as well as the blocked address list, there is high possibility that it is the packet transferred for the first time from the sender, and thus it is categorized as the suspected ARP packet.

Secondly, it is a case that the IP address and MAC address of the sender is individually included in the allowed IP-MAC address list but is different from the combination stored in the allowed IP-MAC address list. For example, the IP-MAC addresses of the first and second clients 106-1 and 106-2 are respectively mapped into [A-a] and [B-b] and stored in the form of the address pair in the allowed IP-MAC address list, and the pair of IP-MAC addresses of the sender of the ARP packet transferred to the particular client 106 is [A-a] or [B-b]. It is a case that the A and B that are the IP addresses and the a and b that are the MAC addresses are in the allowed address list but the construction elements of the mapped address pair are changed, and thus it can be doubted that the addresses are changed by the spoofing attack.

If the address pair is not precisely coincided with that stored in the allowed IP-MAC address list, it may be immediately categorized as the infected ARP packet and blocked, but because there is a case that the MAC address is changed according to communication situations in the network, it is categorized as the suspected ARP for the moment in order to finally confirm it.

The address checking part 108-2 accrues the number of transferred ARP packets having the same departure MAC address as that of the corresponding suspected ARP packet during unit time (S302).

If the counted number for a desired period of time is more than a threshold value, it means that excessive ARP packets are continuously sent through the network, and thus it is a safe practice to regard it as an attempt of the spoofing attack (S204). In case that the suspected ARP packets are generally sent twenty or more times per one second, it is determined that the spoofing attack is being attempted, but this numerical value may be changed according the state of the network. Then, the suspected ARP packet is regarded as the infected ARP packet and the blocking process is carried out.

Meanwhile, it can be determined in the same manner whether an ARP packet transferred from one client 106 to the other client 106 is infected by the spoofing attack.

The address checking part 108-2 checks whether a departure IP address and a departure MAC address of an Ethernet header of an ARP packet send to other client 106 through the L2 switch 104 are included in a local IP-MAC address list. Since the local IP-MAC address list has address information of all hardware devices of the particular client 106 included in the network, if the departure address of the ARP packet transferred from the particular client 106 is different from the local IP-MAC address list, it can be regarded that the corresponding particular client 106 is already infected by the spoofing attack.

Therefore, the ARP packet of which the departure IP address and the departure MAC address of the Ethernet header are not included in the local IP-MAC address list is regarded as the infected ARP packet, and the blocking process is performed. That is, when the departure IP address and the departure MAC address are extracted from the transferred ARP packet, it is regarded as the infected ARP packet if the extracted IP address is not in the local IP-MAC address list.

Furthermore, it is checked whether the same IP address as the extracted IP address is included in the local IP-MAC address list. As a result thereof, if the same IP address is found and there is the corresponding MAC address, the corresponding MAC address is checked. If the departure MAC address of the transferred ARP packet is different from the MAC address checked in the local IP-MAC address list, this is also the infected ARP packet.

When the ARP packet is regarded as the safe packet through all of the checking processes as described above, the transferring of the ARP packet to the destination is performed (S118).

When the Allowed Address List is Stored in the Client

In case that the allowed IP-MAC address list and the blocked MAC address list are stored in the allowed address DB 106-1*d* and the blocked address DB 106-1*e* of the individual client 106, the ARP table protecting part 106-1*b* and the ARP packet processing part 106-1*c* of the client 106 check autonomously whether there is the spoofing attack, when the ARP packet is input to each client 106 through the L2 switch 104, or whenever the allowed address DB 106-1*d* and the blocked address DB 106-1*e* are updated. Herein, the check on whether there is the spoofing attack is not requested to the blocking server 108, but the client 106 performs directly the check.

In this case, it is determined whether the departure MAC address is coincided with the address list stored in the DBs 106-1*d* and 106-1*e*. The ARP table protecting part 106-1*b* receives, periodically or whenever a particular event occurs, the allowed IP-MAC address list and the blocked MAC address list which are collected and generated by the blocking server 108, such that the allowed address DB 106-1*d* and the blocked address DB 106-1*e* can be always maintained in the state of being updated.

The ARP table protecting part 106-1*b* checks periodically the ARP entry and compares the extracted IP-MAC address with the address list stored in the DBs 106-1*d* and 106-1*e* in order to determine whether it is infected. And whenever the ARP packet is received or transferred, the ARP packet processing part 106-1*c* extracts the IP-MAC address and determines whether it is infected.

If the departure MAC address is the same as the MAC address stored in the blocked IP-MAC address list, the ARP packet processing part 106-1*c* blocks the corresponding ARP packet, or the ARP table protecting part 106-1*b* changes the MAC address of the ARP entry.

In addition, for the suspected ARP packet, it is also monitored whether the ARP packet having the same MAC address is introduced for a desired period of time, and if it is more than a predetermined threshold value, it is categorized as the infected ARP packet.

If the departure IP-MAC address of the ARP packet transferred from the client 106 is different from information stored in the local IP-MAC address list, it is categorized as the infected ARP packet.

Process of Blocking the Spoofing Attack

If an ARP packet is regarded as the infected ARP packet by the blocking server 108 or the client 106, it is necessary to prevent the ARP packet from being transferred through the network.

To this end, the receiving and transferring of the infected ARP packet is firstly blocked, and the corresponding IP-MAC address is amended in the ARP table (S112). If the ARP packet processing part 106-1*c* is informed from the blocking server 108 about that the ARP packet is used in the spoofing attack, the ARP packet processing part 106-1*c* blocks the receiving and transferring of the corresponding infected ARP packet.

And when it is informed that the ARP entry is used in the spoofing attack, the ARP table protecting part 106-1*b* extracts the IP address from the IP-MAC address included in the infected ARP entry and asks the DBs 108-3 and 108-4 of the blocking server or the DBs 106-1*d* and 106-1*e* for a normal MAC address stored to be corresponding to the extracted IP address. After checking the normal MAC address, the departure (sender) address of the infected ARP entry is statically set as the stored normal MAC address (S114). After that, when an ARP packet having the corresponding IP address is received, the ARP packet is transferred only to the client 106 having the statically set normal MAC address.

The ARP table protecting part 106-1*b* and the ARP packet processing part 106-1*c* transfers information, such as an operation type, departure IP address, departure MAC address, destination IP address, destination MAC address and packet sending process of the blocked packet, to the blocking server 108 (S116). The address collecting part 108-1 of the blocking server 108 receives data transferred from the ARP table protecting part 106-1*b* and the ARP packet processing part 106-1*c* and updates the blocked address DB 108-4.

While the present invention has been described with respect to the specific embodiments, it will be apparent to those skilled in the art that various changes and modifications may be made without departing from the spirit and scope of the invention as defined in the following claims.

Industrial Applicability

According to the present invention, in the blocking of the spoofing attack on a network, it is possible to previously store an IP address and MAC address for a normal hardware connected to the network and then monitor it, and thus it is possible to perform a precise defending process at the earliest practicable time.

Further, since the blocked MAC address list and allowed IP-MAC address list are stored in each client as well as the blocking server and each client can detect and block the spoofing attack, it is possible to reduce the load of the blocking server and also reduce responding time.

The invention claimed is

1. A spoofing attack defense method using a blocking server, which checks an IP address and a MAC address included in an ARP packet relayed through an L2 switch 104 in a network and blocks a transferring of the ARP packet when it is confirmed that the addresses are used in a spoofing attack, comprising:

a first step that an address collecting part 108-1 of the blocking server 108 collects IP addresses and MAC addresses of clients 106 connected to the network;

a second step that the address collecting part 108-1 generates an allowed IP-MAC address list in which the IP address and MAC address collected in the first step are corresponding to each other and stores the allowed IP-MAC address list in an allowed address DB 108-3;

a third step that the address collecting part 108-1 stores a blocked MAC address list, which is information about the MAC address of a client 106 used by a spoofing attacker, in a blocked address DB 108-4;

a fourth step that, when an ARP packet is introduced to the client 106, an ARP packet processing part 106-1c of the client 106 extracts an IP address and a MAC address of a sender included in the ARP packet, transfers the extracted IP address and MAC address to the blocking server 108 and requests a check on whether there is a spoofing attack;

a fifth step that, when the MAC address of the sender extracted in the fourth step is included in the blocked MAC address list stored in the block address DB 108-4, as a checking result of an address checking part 108-2 of the blocking server 108, the blocking server 108 informs a fact that the ARP packet is infected to the client 106; and a sixth step that the ARP packet processing part 106-1c blocks transferring and receiving of the infected ARP packet, wherein the fifth step further comprises:

a 5-1st step that, when the MAC address of the sender extracted in the fourth step is not included in the blocked MAC address list, if the IP address and MAC address of the sender is not in the allowed IP-MAC address list, or if the IP address and MAC address of the sender is different from configuration of the allowed IP-MAC addresses which are mapped in the allowed IP-MAC address list and stored in an address pair, the ARP packet is defined as a suspected ARP packet;

a 5-2nd step that the address checking part 108-2 accrues the number of transferred ARP packets having the same sender MAC address as a sender MAC address included in the suspected ARP packet out of the ARP packets introduced to the client 106 during unit time; and a 5-3rd step that, the accrued number during a desired period of time is more than a threshold value, the suspected ARP is categorized as an infected ARP packet.

2. A spoofing attack defense method using a blocking server, which checks an IP address and a MAC address included in an ARP packet relayed through an L2 switch 104 in a network and blocks a transferring of the ARP packet when it is confirmed that the addresses are used in a spoofing attack, comprising:

a first step that an address collecting part 108-1 of the blocking server 108 collects IP addresses and MAC addresses of clients 106 connected to the network;

a second step that the address collecting part 108-1 generates an allowed IP-MAC address list in which the IP address and MAC address collected in the first step are corresponding to each other and stores the allowed IP-MAC address list in an allowed address DB 106-1d of the client 106;

a third step that the address collecting part 108-1 stores a blocked MAC address list, which is information about the MAC address of a client 106 used by a spoofing attacker, in a blocked address DB 108-4;

a fourth step that, when an ARP packet is introduced to the client 106, an ARP packet processing part 106-1c of the client 106 extracts an IP address and a MAC address of a sender included in the ARP packet and checks whether there is a spoofing attack;

a fifth step that, when the MAC address of the sender extracted in the fourth step is included in the blocked MAC address list, the ARP packet is categorized as an infected ARP packet by the ARP packet processing part 106-1c; and a sixth step that the ARP packet processing part 106-1c blocks transferring and receiving of the infected ARP packet, wherein the fifth step further comprises:

a 5-1st step that, when the MAC address of the sender extracted in the fourth step is not included in the blocked MAC address list, if the IP address and MAC address of the sender is not in the allowed IP-MAC address list, or if the IP address and MAC address of the sender is different from configuration of the allowed IP-MAC addresses which are mapped in the allowed IP-MAC address list and stored in an address pair, the ARP packet is defined as a suspected ARP packet;

a 5-2nd step that the ARP packet processing part 106-1c accrues the number of transferred ARP packets having the same sender MAC address as a sender MAC address included in the suspected ARP packet out of the ARP packets introduced to the client 106 during unit time; and a 5-3rd step that, the accrued number during a desired period of time is more than a threshold value, the suspected ARP is categorized as an infected ARP packet.

3. A spoofing attack defense method using a blocking server, which checks an IP address and a MAC address included in an ARP packet relayed through an L2 switch 104 in a network and blocks a transferring of the ARP packet when it is confirmed that the addresses are used in a spoofing attack, comprising:

a first step of collecting an IP address and a MAC address of devices installed in a particular client 106;

a second step of storing a local IP-MAC address list, in which the IP address and MAC address collected in the first step are corresponding to each other, in an allowed address DB 106-1d of the client 106;

a third step that, when an ARP packet is transferred from the particular client, an ARP packet processing part 106-1c of the particular client 106 extracts an IP address and a MAC address of a sender included in the transferred ARP packet and checks whether there is the spoofing attack;

a fourth step that, if the IP address of the sender extracted in the third step is not included in the local IP-MAC address list, or it the MAC address stored to be corresponding to the same IP address as the extracted IP address of the sender is different from the MAC address of the sender included in the transferred ARP packet, the transferred ARP packet is categorized as an infected ARP packet by the ARP packet processing part 106-1c; and a fifth step that the ARP packet processing part blocks transferring of the infected ARP packet.

* * * * *